United States Patent
Li (10) Patent No.: US 11,212,371 B2
(45) Date of Patent: Dec. 28, 2021

(54) OPERATION REQUEST ALLOCATION METHODS, APPARATUSES, AND DEVICES

(71) Applicant: Advanced New Technologies Co., Ltd., Grand Cayman (KY)

(72) Inventor: Yanpeng Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/162,801

(22) Filed: Jan. 29, 2021

(65) Prior Publication Data

US 2021/0152667 A1 May 20, 2021

Related U.S. Application Data

(63) Continuation of application No. PCT/CN2019/119091, filed on Nov. 18, 2019.

(30) Foreign Application Priority Data

Dec. 25, 2018 (CN) .......................... 201811589917.4

(51) Int. Cl.
*H04L 29/06* (2006.01)
*G06F 9/48* (2006.01)
(Continued)

(52) U.S. Cl.
CPC ............ *H04L 67/42* (2013.01); *G06F 9/4881* (2013.01); *G06F 9/5027* (2013.01);
(Continued)

(58) Field of Classification Search
CPC ..... H04L 67/42; H04L 9/0637; H04L 67/306; H04L 67/34; G06F 9/4881; G06F 9/5027
See application file for complete search history.

(56) References Cited

U.S. PATENT DOCUMENTS

| 10,594,689 B1 * | 3/2020 | Weaver ................ H04L 9/3247 |
| 2017/0262519 A1 * | 9/2017 | Horowitz ............ G06F 11/0709 |

(Continued)

FOREIGN PATENT DOCUMENTS

| CN | 102882699 | 1/2013 |
| CN | 104301408 | 1/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Michael A Keller
(74) *Attorney, Agent, or Firm* — Fish & Richardson P.C.

(57) ABSTRACT

Embodiments of the present specification disclose operation request allocation methods, apparatuses, and devices. One method includes: obtaining, by a server, an operation request sent by a client device for performing an operation associated with a blockchain; obtaining, by the server, attribute information of a user of the client device; determining, by the server, a node condition selected by the user based on the attribute information; determining, by the server based on the node condition, a target node from a set of nodes that have persistently connected to the server; and assigning the operation request to the target node.

17 Claims, 4 Drawing Sheets

(51) Int. Cl.
  *G06F 9/50* (2006.01)
  *H04L 9/06* (2006.01)
  *H04L 29/08* (2006.01)

(52) U.S. Cl.
  CPC .......... *H04L 9/0637* (2013.01); *H04L 67/306* (2013.01); *H04L 67/34* (2013.01)

(56) References Cited

U.S. PATENT DOCUMENTS

| | | | |
|---|---|---|---|
| 2018/0189100 A1* | 7/2018 | Nemoto | G06F 9/5027 |
| 2018/0337847 A1* | 11/2018 | Li | H04L 67/1029 |
| 2019/0036712 A1* | 1/2019 | Qiu | H04L 63/12 |
| 2019/0102755 A1* | 4/2019 | Owens | G06Q 20/065 |
| 2019/0317934 A1* | 10/2019 | Jentzsch | H04L 9/3239 |
| 2019/0320014 A1* | 10/2019 | Allen | H04L 67/104 |
| 2019/0349188 A1* | 11/2019 | Guo | H04L 9/0637 |
| 2020/0005292 A1* | 1/2020 | Mao | H04L 9/3247 |
| 2020/0092084 A1* | 3/2020 | Maroney | H04L 9/0637 |

FOREIGN PATENT DOCUMENTS

| | | | | |
|---|---|---|---|---|
| CN | 105224609 | | 1/2016 | |
| CN | 105786592 | | 7/2016 | |
| CN | 107239479 | | 10/2017 | |
| CN | 107291862 | | 10/2017 | |
| CN | 107819829 | | 3/2018 | |
| CN | 108052615 | | 5/2018 | |
| CN | 109032803 | | 12/2018 | |
| CN | 109040227 | | 12/2018 | |
| CN | 110046036 | | 7/2019 | |
| EP | 3812899 A1 | * | 4/2021 | |
| TW | 201810148 | | 3/2018 | |
| WO | WO2017173235 | | 10/2017 | |
| WO | WO2018126344 | | 7/2018 | |
| WO | WO-2018228331 A | * | 12/2018 | .......... H04L 9/0637 |
| WO | WO2021022714 | * | 2/2021 | |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/119091, dated Feb. 12, 2020, 9 pages (with partial English translation).

Extended European Search Report in European Application No. 19902567.7, dated Aug. 11, 2021, 8 pages.

\* cited by examiner

OPERATION REQUEST ALLOCATION METHODS, APPARATUSES, AND DEVICES

CROSS-REFERENCE TO RELATED APPLICATIONS

This application is a continuation of PCT Application No. PCT/CN2019/119091, filed on Nov. 18, 2019, which claims priority to Chinese Patent Application No. 201811589917.4, filed on Dec. 25, 2018, and each application is hereby incorporated by reference in its entirety.

TECHNICAL FIELD

The present application relates to the field of computer technologies, and in particular, to operation request allocation methods, apparatuses, and devices.

BACKGROUND

In the existing technology, a consortium blockchain is specific to only dedicated group members and a limited quantity of third parties. A plurality of preselected nodes are formulated inside the consortium blockchain as transaction writers, and generation of each block is jointly determined by all the preselected nodes. In a solution of implementing the consortium blockchain, an enterprise usually provides blockchain services to the outside by using a front-end application. In a traditional software development kit, only a single node link is provided for the front-end application, and user requests cannot be distributed. Consequently, a user's needs for diversified sources of trust cannot be satisfied.

SUMMARY

In view of this, embodiments of the present application provide operation request allocation methods, apparatuses, and devices, so as to satisfy a user's needs for diversified sources of trust.

To alleviate the previous technical problem, the embodiments of the present specification are implemented as follows:

An operation request allocation method provided in the embodiments of the present specification includes: obtaining, by a server, an operation request sent by a client device for a blockchain; obtaining attribute information of a user who logs in to the client device; determining a node condition selected by the user based on the attribute information; determining a target link node from a set of nodes keeping a persistent link to the server based on the node condition; and allocating the operation request to the target link node.

An operation request allocation apparatus provided in the embodiments of the present specification includes: an operation request acquisition module, configured to obtain an operation request sent by a client device for a blockchain; an attribute information acquisition module, configured to obtain attribute information of a user who logs in to the client device; a node condition determining module, configured to determine a node condition selected by the user based on the attribute information; a target link node determining module, configured to determine a target link node from a set of nodes keeping a persistent link to the server based on the node condition; and an operation request allocation module, configured to allocate the operation request to the target link node.

An operation request allocation device provided in the embodiments of the present specification includes: at least one processor; and a memory communicating with and linking to the at least one processor.

The memory stores an instruction that can be executed by the at least one processor, and the instruction is executed by the at least one processor, so that the at least one processor can: obtain an operation request sent by a client device for a blockchain; obtain attribute information of a user who logs in to the client device; determine a node condition selected by the user based on the attribute information; determine a target link node from a set of nodes keeping a persistent link to the server based on the node condition; and allocate the operation request to the target link node.

At least one of the previous technical solutions used in the embodiments of the present specification can achieve the following beneficial effects:

In the embodiments of the present specification, the attribute information of the user is obtained to determine the node condition selected by the user, and then the target link node requested by the user is determined based on the node condition, thereby fully considering a case that users trust different nodes at different degrees because the users have different perceptions of the nodes. Different routing policies are used for requests of different users, thereby satisfying the user's needs for diversified sources of trust.

BRIEF DESCRIPTION OF DRAWINGS

The accompanying drawings described here are used to provide a further understanding of the present application, and constitute a part of the present application. Example embodiments of the present application and descriptions of the embodiments are used to explain the present application, and do not constitute an inappropriate limitation on the present application. In the accompanying drawings.

DETAILED DESCRIPTION

To make the objectives, technical solutions, and advantages of the present application clearer, the following clearly and comprehensively describes the technical solutions of the present application with reference to specific embodiments and accompanying drawings of the present application. Clearly, the described embodiments are merely some rather than all of the embodiments of the present application. All other embodiments obtained by a person of ordinary skill in the art based on the embodiments of the present application without creative efforts shall fall within the protection scope of the present application.

The following describes in detail the technical solutions provided in the embodiments of the present application with reference to the accompanying drawings.

In a solution of implementing a consortium blockchain, an enterprise usually provides blockchain services to the outside by using a front-end application. The front-end application needs to satisfy needs of a large quantity of users. Different users trust different nodes at different degrees because different users have different perceptions of nodes in the consortium blockchain. Therefore, different users choose to trust different nodes as link nodes of the application to provide services. For example, if there is a transnational consortium blockchain, the user usually selects a node running in the domestic as a link node of the application. However, a function used by the users is provided by the same front-end application. Therefore, the provided front-end application of the blockchain should have a user distribution mode that a plurality of nodes in the blockchain can concurrently switch to.

However, the blockchain is a series of data blocks that are associated and generated by using a cryptography method. Languages such as Java support cryptography at different degrees, and a system local library is usually used to support the cryptography. A quantity of class libraries using an elliptic curve product (cryptography) is relatively small, and a quantity of libraries supporting a plurality of session links is also relatively small. Therefore, in the existing technology, only one-to-one persistent links can be implemented and one-to-many persistent links cannot be supported.

Underlying encryption space and network space are combined for development in the embodiments of the present specification. An encryption control and a network control are integrated in Java in a form of JNI (Java Native Interface), and an underlying link is managed to encapsulate a reusable multi-link session (session control). Then the multi-link session is provided to a client device application in a form of a software development kit (SDK), so as to implement a persistent link between one node and a plurality of nodes, thereby enabling the blockchain front-end application that is provided should have a user distribution mode that a plurality of nodes in the blockchain concurrently switch to.

Figure 1:
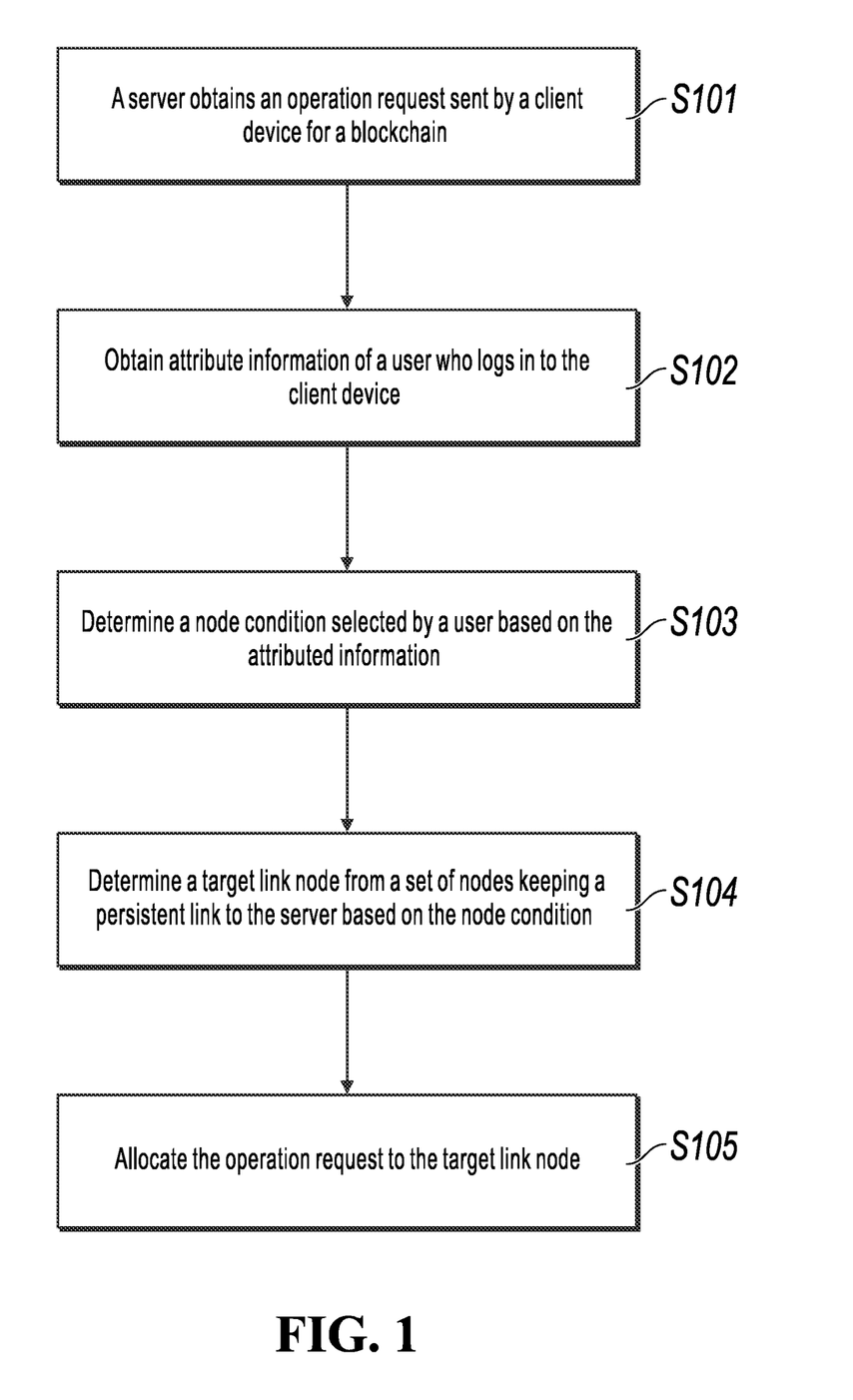
FIG. 1 is a schematic flowchart illustrating an operation request allocation method, according to an embodiment of the present specification.

FIG. 1 is a schematic flowchart illustrating an operation request allocation method, according to some embodiments of the present specification. From a program perspective, the procedure can be executed by a program or an application client device mounted on an application server.

As shown in FIG. 1, the procedure can include the following steps:

S101: A server obtains an operation request sent by a client device for a blockchain.

The blockchain technology is a new distributed infrastructure and calculation method that uses a blockchain-type data structure to verify and store data, uses a distributed node consensus algorithm to generate and update data, uses cryptography to ensure security of data transmission and access, and uses a smart contract formed by automated script code to program and operate data.

Usually, a blockchain system includes a data layer, a network layer, a consensus layer, an incentive layer, a contract layer, and an application layer. The data layer encapsulates basic data and basic algorithms such as an underlying data block, related data encryption, and a timestamp. The network layer includes a distributed networking mechanism, a data propagation mechanism, a data verification mechanism, etc. The consensus layer mainly encapsulates various consensus algorithms of a network node. The incentive layer integrates an economic factor into the blockchain technology system, and mainly includes an economic-incentive issuance mechanism and distribution mechanism. The contract layer mainly encapsulates various scripts, algorithms, and, smart contracts, and is a basis of a programmable feature of the blockchain. The application layer encapsulates various application scenarios and cases of the blockchain. In the model, a timestamp-based chaining block structure, a distributed node consensus mechanism, a consensus computing power-based economic incentive, and a flexible and programmable smart contract are the most representative innovations of the blockchain technology.

In a solution of implementing a consortium blockchain, an enterprise usually provides blockchain services to the outside by using a front-end application. The front-end application needs to satisfy needs of a large quantity of users. The user needs to access data information of the blockchain by using a node provided by the front-end application.

An operation request of the user usually includes a read operation, a write operation, and a consensus operation that are specific to the blockchain. The embodiments of the present application are specific to the read operation.

Different users have different perceptions of nodes in the consortium blockchain, and therefore different users trust different nodes at different degrees. As a result, different users choose to trust different nodes as link nodes of the application to provide services.

S102: Obtain attribute information of a user who logs in to the client device.

In some embodiments of the present specification, the attribute information of the user can include intrinsic attribute information and dynamic attribute information. The intrinsic attribute information can include login address information, nationality information, gender information, and institution information of the user. The dynamic attribute information can include a link node selected by the user last time, a link node most frequently used by the user, and a link node automatically selected by the user.

The user can log in to the client device on a webpage or on an application (APP).

The attribute information of different users can be the same or different, which is greatly related to a user difference and habit. Specific attribute information that needs to obtain can be flexibly determined based on an actual situation.

S103: Determine a node condition selected by the user based on the attribute information.

In the embodiment of the present specification, the node condition selected by the user needs to be determined based on the attribute information after the attribute information of the user is obtained, and the node condition indicates a need of the user for selection of a link node.

For example, if the user needs to access a transnational blockchain, the user usually selects a node running in the domestic as a link node of the application. As such, the node condition selected by the user can be determined based on a nationality of the user. If the nationality of the user is China, the node condition can be selecting a node whose organization or institution is in China as the link node. If the nationality of the user is France, the corresponding node condition is selecting a node whose organization or institution is in France as the link node. In addition, if the nationality of the user is France, but the login address information of the user is China, the user can select a node whose registered institution is in China to link. In this case, the node condition is selecting a node whose registered institution is in China as the link node.

For example, if the user needs to access a cross-domain blockchain, the user usually trusts a node in its own field more. If registration information of the user is associated with the financial industry, the node condition can be selecting a node of a financial institution as the link node. If the registration information of the user is the educational industry, the node condition can be selecting a node of an educational institution as the link node.

For example, if user A uses node 1 to access a blockchain a plurality of times, it indicates that user A trust node 1 very much. As such, the node condition can be determined as selecting node 1 as the link node.

There is one node condition in all the previous examples. Certainly, there can be a plurality of node conditions in another scenario. In addition, a priority can be set between the plurality of conditions: which condition must be satisfied, and which condition doesn't have to be satisfied. Different coefficients can be set for the conditions. These can be specifically set based on diversity of users and nodes. This is not specifically limited here.

S104: Determine a target link node from a set of nodes keeping a persistent link to the server based on the node condition.

A persistent link is a link method keeping a continuous link to a server by using a socket. The persistent link is mostly used for frequently operated point-to-point communication that a quantity of links cannot be too large. Each Transmission Control Protocol (TCP) link needs a three-step handshake, and this takes time. If each operation is a short link, a processing speed decreases a lot when the operation is re-performed. Therefore, all the operations do not disconnected from each other after being completed, and a data packet is directly sent during next processing without establishing a TCP link.

The socket is as follows: The TCP uses an IP address of a host plus a port number on the host as an endpoint of the TCP link.

In some embodiments of the present specification, a node keeping a persistent link to the server is known. After the node condition is determined based on the attribute information of the user, the node condition needs to be compared with each node in the node set to select a node that best matches the node condition as the target link node.

For example, when the node condition is selecting a node whose organization or institution is in China as the link node, if only node 1 whose registered institution is in China exists in the node set, node 1 is directly determined as the target link node.

For example, when the node condition is selecting a node of a financial institution whose registered location is in China as the link node, if node 1: Bank of France (the registered location is in France) and node 2: Bank of China (the registered location is in China), node 2 is determined as the target link node.

It is worthwhile to note that there can be a plurality of application front ends, and there can also be a plurality of nodes. The application front ends and the nodes are separately combined in a one-to-many mode or a many-to-many mode, and nodes corresponding to different application front ends can be the same or different.

S105: Allocate the operation request to the target link node.

In some embodiments of the present specification, the server allocates the operation request to a node relatively trusted by the user, and performs a read operation or a write operation on the blockchain, thereby satisfying diversity of user needs.

In the method in FIG. 1, the attribute information of the user is obtained to determine the node condition selected by the user, and then the target link node requested by the user is determined based on the node condition, thereby fully considering a case that the user trusts different nodes at different degrees because the user has different perceptions of the nodes. Different routing policies are used for operation requests of different users, thereby satisfying the user's needs for diversified resources of trust.

Figure 2:
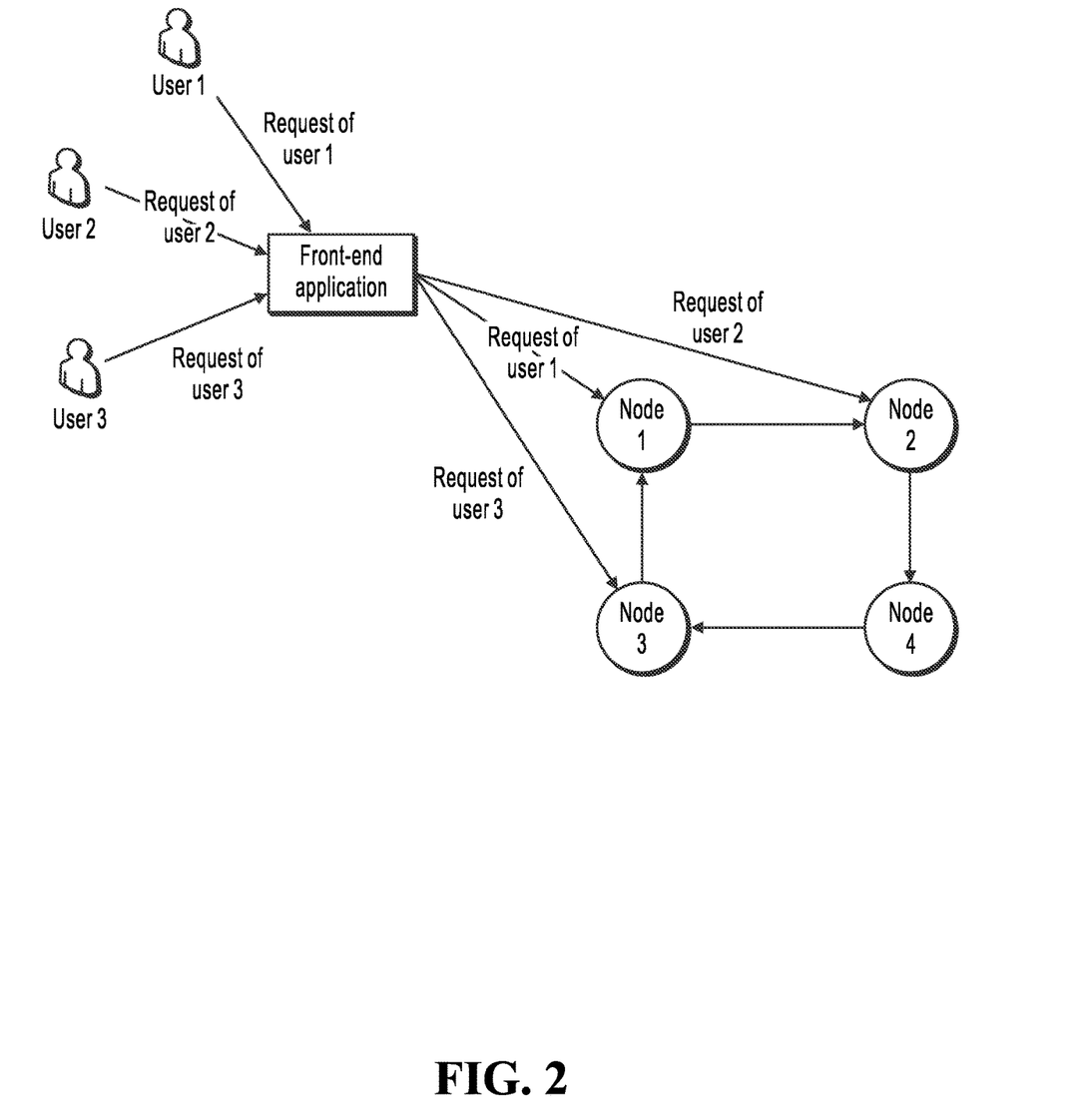
FIG. 2 is a schematic diagram using the operation request allocation method in the embodiments of the present specification.

FIG. 2 is a schematic diagram using the operation request allocation method in the embodiments of the present specification. As shown in FIG. 2, a consortium blockchain includes node 1, node 2, node 3, and node 4.

User selection scenarios are as follows:

1. User 1 logs in and sends operation request 1, and the front-end application sends request 1 based on link node 1 in a user preference link block.

2. User 2 logs in and sends operation request 2, and the front-end application sends request 2 based on link node 2 in the user preference link block.

3. User 3 logs in and sends operation request 3, and the front-end application sends request 3 based on link node 3 in the user preference link block.

The link node in the user preference link block can be implemented based on an inherent attribute of the user, or can be implemented based on automatic selection of the user. There are many implementations.

Based on the method in FIG. 1, the embodiments of the present specification further provide some specific implementations of the method, which are described below.

Optionally, the determining a target link node from a set of nodes keeping a persistent link to the server based on the node condition specifically includes:

obtaining attribute information of each node in the set of nodes keeping a persistent link to the server;

matching the attribute information of each node with the node condition to determine a first node with a highest similarity value to the node condition; and determining the target link node based on the first node.

A specific scenario is provided in the embodiments of the present specification. The node condition determined based on the attribute information of the user is matched with each node in the node set. Each node also has its own attribute information, such as an organization name, a headquarters location, stability, a server configuration, and a budget. The attribute information of each node is extracted and compared with the node condition to obtain a similarity value.

For example, the node condition includes condition 1, condition 2, and condition 3, and proportion coefficients respectively occupied by the conditions are 0.5, 0.3, and 0.2. The node set includes node A, node B, and node C.

Case 1: Node A satisfies condition 1 and condition 3, and the similarity value is 0.7; node B satisfies condition 2 and condition 3, and the similarity value is 0.5; and node C satisfies none of the conditions, and the similarity value is 0. Therefore, it can be determined that node A is the node with a highest similarity value to the node condition, and node A is determined as the target link node.

Case 2: Node A satisfies condition 1, and the similarity value is 0.5; node B satisfies condition 2 and condition 3, the similarity value is 0.5; and node C satisfies condition 3, and the similarity value is 0.2. In this case, both the similarity value of node A and similarity value of node B are 0.5, and node A or node B can be selected at any time as the target link node. In addition, other conditions such as system pressures of node A and node B can be determined, and a node with a small system pressure is preferentially selected as the target link node to balance system pressures of all nodes. Certainly, there are other determining conditions, which are not listed here.

Optionally, the obtaining attribute information of a user who logs in to the client device specifically includes:

presenting a plurality of nodes included in the set of nodes keeping a persistent link to the server to the user; and obtaining a first node selected by the user.

The determining a target link node from a set of nodes keeping a persistent link to the server based on the node condition specifically includes:

determining the target link node based on the first node.

In the embodiments of the present specification, another implementation of determining the target link node is further provided. Because a node keeping a persistent link to the server is known, the server can send the previous nodes to the client device in a list form. The client device displays the node information after receiving the node information. The client device displays the attribute information of the node on a display interface of the node when displaying the node. The user can select a first node mostly satisfies a need of the user from the node set based on a status or a preference of the user, and send the first node to the server. If there is no special case, the server uses the first node selected by the user as the target link node requested by the user.

Optionally, the determining the target link node based on the first node specifically includes:

determining whether a system pressure of the first node exceeds a predetermined value to obtain a first determining result; and determining the first node as the target link node when the first determining result indicates that the system pressure of the link node does not exceed the predetermined value; or determining a second node as the target link node when the first determining result indicates that the system pressure of the link node exceeds the predetermined value, where a system pressure of the second node is less than the predetermined value.

In the embodiments of the present specification, if a quite large quantity of users selecting the same node as the target link node, and a quantity of times that another node is selected is very small, and user requests are still continuously allocated to the node in this case, a processing speed of the node decreases or the node is even in a crash state due to impact of a hardware device. Based on the previous reason, in this method, in addition to considering diversified needs of the user, a pressure of processing a user request by each node is considered, and horizontal scaling of the pressure is performed based on a balancing measure.

Whether a system pressure of a node reaches an upper limit value usually needs to be determined, and the operation request needs to be allocated to another node if the system pressure reaches the upper limit value. The system pressure of the node is usually related to a configuration of a server of the node, for example, a processor, a memory, hard disk quality, and I/O bandwidth. There are many parameters representing the system pressure, such as a throughput (Throughput) and a response time (RT). The throughput and the response time are selected for description in the embodiments of the present specification, but this is not construed as a specific limitation on the claims.

The throughput is an amount of data (measured in bits, bytes, packets, etc.) successfully transmitted in a unit of time to a network, a device, a port, a virtual circuit, or another facility. Usually, a throughput of a node is tens of thousands of TPS, hundreds of thousands of TPS, or even higher. If a throughput of a node is thousands of TPS, it indicates that the system pressure of the node exceeds a normal case, and the node cannot normally process a user request. Therefore, the user request of the node needs to be allocated to another node.

The response time is a time that a system responds to a request, and the response time comprehensively records a time that the entire computer system processes the request. The system response time includes two aspects: a time length and time volatility. The user response time should be appropriate. If the system response time is too long, the user feels upset and frustrated; and if the response time is too short, the user speeds up the operation, resulting in errors. The volatility of the system response time is deviation from an average response time. Low response time volatility helps the user establish a stable pace even if the response time is relatively long.

When a response time of a system is discussed, it usually means an average time of all functions of the system or a maximum response time of all functions of the system. Certainly, it is often necessary to discuss an average response time and a maximum response time of each function or each group of functions. In the embodiments of the present specification, a response time of a node is a feedback time that the node drops a block on the blockchain through consensus, that is, a total time that the user sends the request, the front-end application obtains and forwards the user request to a corresponding link node, and the link node drops a block on the blockchain. This process usually takes a hundreds of milliseconds. If the response time is less than 100 milliseconds, it indicates that the node is in a very good state; if the response time is about 1 second, it indicates that the system pressure of the node increases and performance of the node begins to decrease; if the response time reaches 5 seconds, it indicates that the system pressure of the node reaches an upper limit, and performance of the node decreases a lot. If the response time of the node exceeds 5 seconds, it indicates that the node cannot process the user request normally, and the user request needs to be allocated to another node.

Optionally, the determining whether a system pressure of the first node exceeds a predetermined value can specifically include at least the following: determining whether a throughput of the first node is less than a predetermined throughput, or determining whether a response time of the first node exceeds a predetermined response time.

In the embodiments of the present specification, when it is determined whether a system pressure of a node exceeds the predetermined value, if the throughout is selected as a representation parameter of the system pressure, the predetermined value can be set to 10,000 TPS (predetermined values are different in different scenarios). If the predetermined value is less than 10,000 TPS, it indicates that the system pressure of the first node exceeds a normal value. In this case, user requests need to be distributed.

In the embodiments of the present specification, if the response time is selected as the representation parameter of the system pressure, the predetermined value can be set to 5 s (predetermined values are different in different scenarios). If the response time of the first node is 3 s, it indicates that the system pressure of the first node is in a normal state, and the user request can be normally processed. If the response time of the first node is 6 s, it indicates that the system pressure of the first node is relatively high, and user requests need to be distributed.

In the embodiments of the present specification, both the throughput and the response time can be selected as representation parameters of the system pressure. Only when both of the two parameters satisfy a specific condition, it indicates that the system pressure of the node exceeds a normal range. For example, the throughput is less than 8,000 TPS and the response time exceeds 3 s. Only when both of the two conditions are satisfied, it indicates that the system pressure of the node exceeds the normal range.

Optionally, it is determined whether a node whose system pressure is less than the predetermined value exists in the node set to obtain a second determining result.

A quantity of second nodes is determined when the second determining result indicates that the node whose system pressure is less than the predetermined value exists in the node set. The second node is the node whose system pressure is less than the predetermined value in the node set.

The second node is determined as the target link node when there is one second node.

A similarity value between attribute information of each second node and the node condition is determined when there are a plurality of second nodes.

A second node with a highest similarity value to the node condition is determined as the target link node.

In the embodiments of the present specification, user requests need to be distributed when the system pressure of the first node exceeds a normal value, and an appropriate node first needs to be selected from the set of nodes keeping a persistent link to the server as the target link node. A selection condition is that the system pressure is less than the predetermined value. If there is such a node (the second node) in the set and there is only one such node, the node can be directly determined as the target link node.

In the embodiments of the present specification, if there are a plurality of second nodes satisfying the condition, such as node A, node B, and node C, one node can be selected from the nodes based on different solutions. The following solutions can be used.

Solution 1: Random allocation, that is, random allocation is performed by the server without referring to another condition.

Solution 2: Further selection is performed based on each second node and the node condition requested by the user. A specific method is determining a similarity value between the node condition and attribute information of node A, node B, and node. For example, the similarity value of node A is 0.1, the similarity value of node B is 0.3, and the similarity value of node C is 0.25. Node B can be selected as the target link node because the similarity value of node B is the highest, and relatively satisfies a need of the user.

Solution 3: Further selection is performed based on a specific system pressure of each second node. A specific method is determining system pressures of node A, node B, and node C. Response times are used as examples, and are respectively 100 ms, 200 ms, and 300 ms. Node A can be selected as the target link node because the response time of node A is the fastest.

Optionally, a server configuration parameter of a candidate node is obtained when the second determining result indicates that no node whose system pressure is less than the predetermined value exists in the node set.

Identity verification is performed on the candidate node using a consensus mechanism of the blockchain when the server configuration parameter satisfies a predetermined condition.

The candidate node is added to the blockchain when the identity verification on the candidate node succeeds.

A persistent link is set between the candidate node and the server.

In the embodiments of the present specification, if system pressures of all nodes in the node set exceed the predetermined value, it indicates that each node in the blockchain has a lot of pressure, and a processing speed of the node is very slow. In this case, a new node needs to be added to share pressure of the entire blockchain, and the newly added node does not exist in the blockchain.

When system pressures of all nodes linked by the server exceed the predetermined value, a new node needs to be added to process the user request. The newly added node also needs to satisfy certain conditions, such as a hardware condition and identity verification. The hardware condition is a very important point for becoming a node, and only a configuration of the server can reach a specific level, the server can undertake a task that a node serves as a user to request to access. A hardware configuration of a node usually can include at least a 4-core processor, an 8G memory, 10M bandwidth, and a 100 G solid state disk. Certainly, hardware configurations are different due to different operations performed by the node in different blockchains. In addition, all candidate nodes or organizations should provide the following information to the community. The information can be published on a vote detection page or an official website and on an organizational website. (The following list is only for reference): a public website, a social account, a contact method (a mailbox, a Discord account, etc), an organization name, a headquarters location, a server type, a list of server configuration teams and pictures and backgrounds of ⅔ of team members, a technical solution (security, maintenance, long-term stability, disaster recovery backup), maintenance personnel, a budget, a hardware expansion plan, etc. After a hardware device satisfies the requirement, all consensus nodes in the blockchain need to vote for the candidate node. When most consensus nodes consider that the candidate node can become a node, that is, reach an agreement, it is proved that the candidate node can become a node in the blockchain. After the node joins the blockchain, a persistent link to the server of the front-end application is set, that is, the node (the second node) joins the set of nodes keeping a persistent link to the server. As such, the server can allocate the user request to the second node to implement fragmentation and horizontal scaling when there is a large quantity of user requests.

Figure 3:
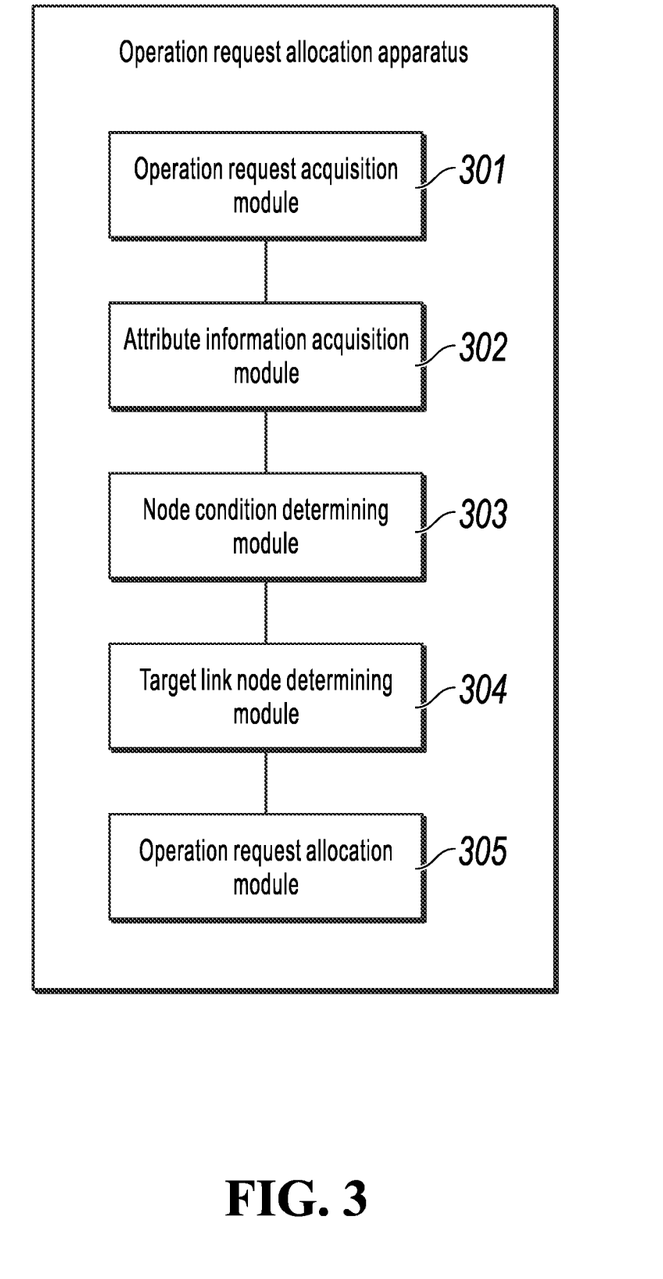
FIG. 3 is a schematic structural diagram illustrating an operation request allocation apparatus corresponding to FIG. 1, according to an embodiment of the present specification.

Based on the same idea, the embodiments of the present specification further provide an apparatus corresponding to the previous method. FIG. 3 is a schematic structural diagram illustrating an operation request allocation apparatus corresponding to FIG. 1, according to an embodiment of the present specification. As shown in FIG. 3, the apparatus can include:

an operation request acquisition module 301, configured to obtain, by a server, an operation request sent by a client device for a blockchain;

an attribute information acquisition module 302, configured to obtain attribute information of a user who logs in to the client device;

a node condition determining module 303, configured to determine a node condition selected by the user based on the attribute information;

a target link node determining module 304, configured to determine a target link node from a set of nodes keeping a persistent link to the server based on the node condition; and an operation request allocation module 305, configured to allocate the operation request to the target link node.

Optionally, the attribute information acquisition module 302 is specifically configured to obtain at least one of login address information, nationality information, gender information, institution information, a previous link node, a most commonly used link node, and an automatically selected link node that are of the user who logs in to the client device.

Optionally, the target link node determining module 304 specifically includes:

an attribute information acquisition submodule, configured to obtain attribute information of each node in the set of nodes keeping a persistent link to the server;

a first node determining submodule, configured to match the attribute information of each node with the node condition to determine a first node with a highest similarity value to the node condition; and a target link node determining submodule, configured to determine the target link node based on the first node.

Optionally, the attribute information acquisition module 302 specifically includes:

a node presenting submodule, configured to present a plurality of nodes included in the set of nodes keeping a persistent link to the server to the user; and a first node acquisition submodule, configured to obtain a first node selected by the user.

The target link node determining module 304 specifically includes:

a target link node determining submodule, configured to determine the target link node based on the first node.

Optionally, the target link node determining submodule specifically includes:

a first result determining unit, configured to determine whether a system pressure of the first node exceeds a predetermined value to obtain a first determining result;

a first target link node determining unit, configured to determine the first node as the target link node when the first determining result indicates that the system pressure of the link node does not exceed the predetermined value; and a second target link node determining unit, configured to determine a second node as the target link node when the first determining result indicates that the system pressure of the link node exceeds the predetermined value.

Optionally, the first result determining unit is specifically configured to perform at least one of the following: determine whether a throughput of the first node is less than a predetermined throughput, or determine whether a response time of the first node exceeds a predetermined response time.

Optionally, the second target link node determining module specifically includes:

a second result determining subunit, configured to determine whether a node whose system pressure is less than the predetermined value exists in the node set to obtain a second determining result;

a server configuration parameter acquisition subunit, configured to obtain a server configuration parameter of a candidate node when the second determining result indicates that no node whose system pressure is less than the predetermined value exists in the node set;

an identity verification subunit, configured to perform identity verification on the candidate node using a consensus mechanism of the blockchain when the server configuration parameter satisfies a predetermined condition;

a candidate node adding subunit, configured to add the candidate node to the blockchain when the identity verification on the candidate node succeeds; and a persistent link setting subunit, configured to set a persistent link between the candidate node and the server.

Optionally, the second target link node determining module further includes:

a second node quantity determining subunit, configured to determine a quantity of second nodes when the second determining result indicates that the node whose system pressure is less than the predetermined value exists in the node set, where the second node is the node whose system pressure is less than the predetermined value in the node set;

a first target link node determining subunit, configured to determine the second node as the target link node when there is one second node;

a similarity value acquisition subunit, configured to determine a similarity value between attribute information of each second node and the node condition when there are a plurality of second nodes; and a second target link node determining subunit, configured to determine a second node with a highest similarity value to the node condition as the target link node.

Based on the same idea, the embodiments of the present specification further provide a device corresponding to the previous method.

Figure 4:
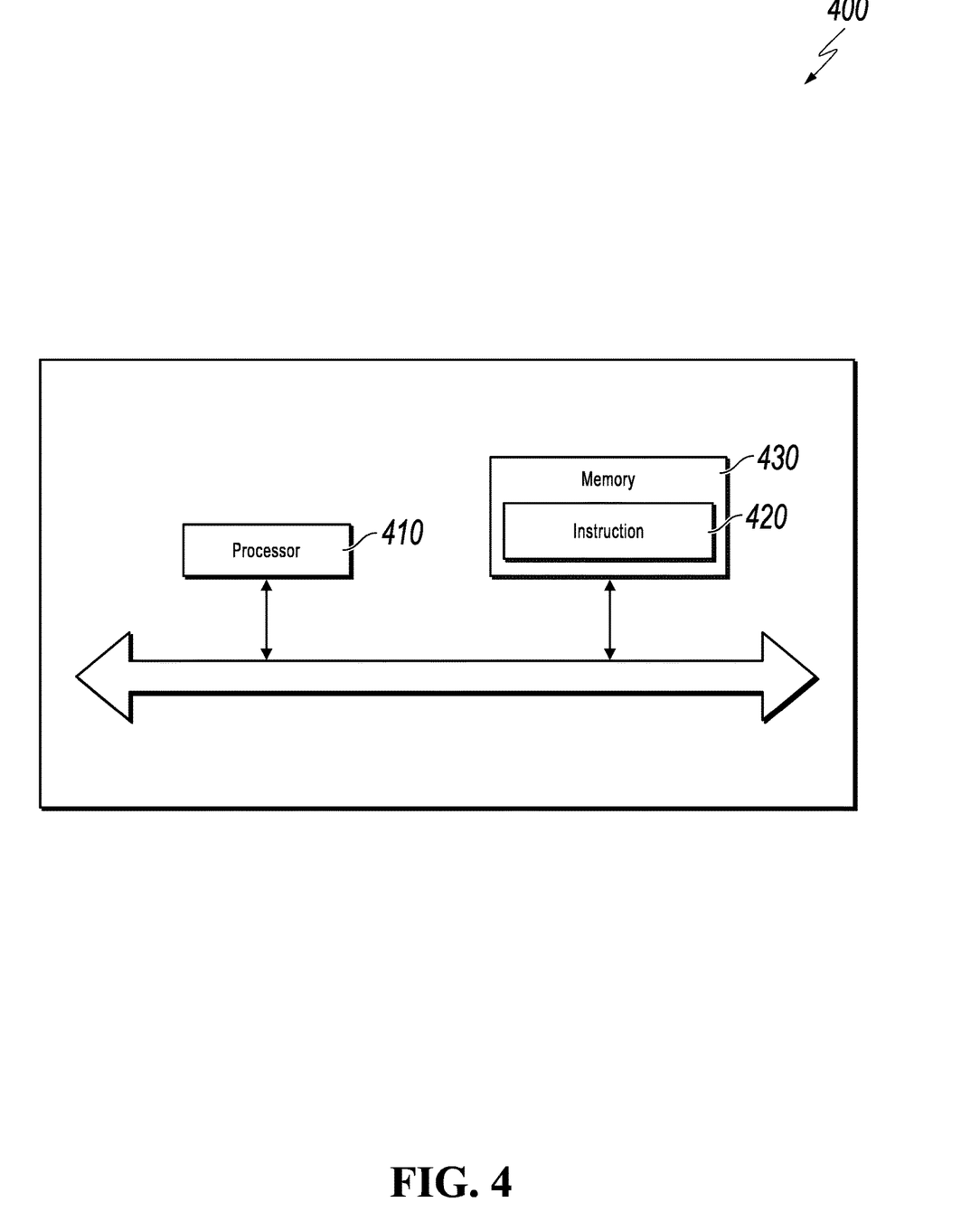
FIG. 4 is a schematic structural diagram illustrating an operation request allocation device corresponding to FIG. 1, according to an embodiment of the present specification.

FIG. 4 is a schematic structural diagram illustrating an operation request allocation device corresponding to FIG. 1, according to an embodiment of the present specification. As shown in FIG. 4, the device 400 can include:

at least one processor 410; and a memory 430 communicating with and linking to the at least one processor.

The memory 430 stores an instruction 420 that can be executed by the at least one processor 410, and the instruction is executed by the at least one processor 410, so that the at least one processor 410 can:

obtain an operation request sent by a client device for a blockchain;

obtain attribute information of a user who logs in to the client device;

determine a node condition selected by the user based on the attribute information;

determine a target link node from a set of nodes keeping a persistent link to the server based on the node condition; and allocate the operation request to the target link node.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, the current improvement for many method procedures can be considered as a direct improvement of a hardware circuit structure. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email receiving and sending device, a game console, a tablet computer, a wearable device, or any combination of these devices.

For ease of description, the apparatus above is described by dividing functions into various units. Certainly, when the present application is implemented, a function of each unit can be implemented in one or more pieces of software and/or hardware.

A person skilled in the art should understand that the embodiment of the present application can be provided as a method, a system, or a computer program product. Therefore, the present application can use a form of hardware only embodiments, software only embodiments, or embodiments with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application is described based on the flowcharts and/or block diagrams of the method, the device (system), and the computer program product based on the embodiments of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device, or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so that a process, a method, a product, or a device that includes a list of elements not only includes those elements but also includes other elements not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer-executable instructions, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The embodiments in the present specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

The previous descriptions are merely embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method comprising:
    obtaining, by a server, an operation request sent by a client device for performing an operation associated with a blockchain;
    obtaining, by the server, attribute information of a user of the client device, comprising:
        presenting a plurality of nodes comprised in a set of nodes to the user, and
        identifying a first node selected by the user in the plurality of nodes;
    determining, by the server, a node condition selected by the user based on the attribute information;
    determining, by the server and based on the node condition and the determined node, a target node from the set of nodes that have persistently connected to the server, comprising:
        determining whether a system characteristic value of the first node is greater than a predetermined value;
        in response to determining that the system characteristic value of the first node is less than or equal to the predetermined value, determining the first node as the target node; and
        in response to determining that the system characteristic value of the first node is greater than the predetermined value, determining a second node as the target node, wherein a system characteristic value of the second node is less than or equal to the predetermined value; and in response to determining that the second node is not within the set of nodes, setting a persistent link between the second node and the server in response to determining that a consensus on adding the second node to the blockchain has been reached; and
    assigning, by the server, the operation request to the target node to perform the operation associated with the blockchain.

2. The computer-implemented method according to claim 1, wherein obtaining attribute information of the user comprises:
    obtaining at least one of login address information, nationality information, gender information, company information, a previously connected node, a most frequently connected node, or a default node of the user.

3. The computer-implemented method according to claim 1, wherein determining the target node from the set of nodes comprises:
    obtaining attribute information of each node in the set of nodes;
    determining, based on the attribute information, a node of the set of nodes with attribute information most similar to the node condition; and
    determining the target node based on the determined node.

4. The computer-implemented method according to claim 1, wherein determining whether the system characteristic value of the first node is greater than the predetermined value comprises at least one of:
    determine whether a throughput of the first node is greater than a predetermined throughput; or
    determine whether a response time of the first node is greater than a predetermined response time.

5. The computer-implemented method according to claim 1, wherein determining the second node as the target node comprises:
    determining whether at least one node in the plurality of nodes has a system characteristic value that is less than the predetermined value;
    in response to determining that none of the plurality of nodes has a system characteristic value less than the predetermined value, obtaining a server configuration parameter of a candidate node;
    performing identity verification on the candidate node using a consensus algorithm of the blockchain when the server configuration parameter satisfies a predetermined condition;
    adding the candidate node to the blockchain when the identity verification on the candidate node succeeds; and
    setting a persistent connection between the candidate node and the server.

6. The computer-implemented method according to claim 5, further comprising:
    in response to determining that at least one node of the plurality of nodes has a system characteristic value less than the predetermined value, determining a quantity of the at least one node;
    determining a similarity value between attribute information of each of the at least one node and the node condition; and
    determining a node of the at least one node with a highest similarity value as the target node.

7. A non-transitory, computer-readable medium storing one or more instructions executable by a computer system to perform operations comprising:
    obtaining, by a server, an operation request sent by a client device for performing an operation associated with a blockchain;

obtaining, by the server, attribute information of a user of the client device, comprising:
    presenting a plurality of nodes comprised in a set of nodes to the user, and
    identifying a first node selected by the user in the plurality of nodes;
determining, by the server, a node condition selected by the user based on the attribute information;
determining, by the server and based on the node condition and the determined node, a target node from the set of nodes that have persistently connected to the server, comprising:
    determining whether a system characteristic value of the first node is greater than a predetermined value;
    in response to determining that the system characteristic value of the first node is less than or equal to the predetermined value, determining the first node as the target node; and
    in response to determining that the system characteristic value of the first node is greater than the predetermined value, determining a second node as the target node, wherein a system characteristic value of the second node is less than or equal to the predetermined value; and in response to determining that the second node is not within the set of nodes, setting a persistent link between the second node and the server in response to determining that a consensus on adding the second node to the blockchain has been reached; and
assigning, by the server, the operation request to the target node to perform the operation associated with the blockchain.

8. The non-transitory, computer-readable medium according to claim 7, wherein obtaining attribute information of the user comprises:
    obtaining at least one of login address information, nationality information, gender information, company information, a previously connected node, a most frequently connected node, or a default node of the user.

9. The non-transitory, computer-readable medium according to claim 7, wherein determining the target node from the set of nodes comprises:
    obtaining attribute information of each node in the set of nodes;
    determining, based on the attribute information, a node of the set of nodes with attribute information most similar to the node condition; and
    determining the target node based on the determined node.

10. The non-transitory, computer-readable medium according to claim 7, wherein determining whether the system characteristic value of the first node is greater than the predetermined value comprises at least one of:
    determine whether a throughput of the first node is greater than a predetermined throughput; or
    determine whether a response time of the first node is greater than a predetermined response time.

11. The non-transitory, computer-readable medium according to claim 7, wherein determining the second node as the target node comprises:
    determining whether at least one node in the plurality of nodes has a system characteristic value that is less than the predetermined value;
    in response to determining that none of the plurality of nodes has a system characteristic value less than the predetermined value, obtaining a server configuration parameter of a candidate node;
    performing identity verification on the candidate node using a consensus algorithm of the blockchain when the server configuration parameter satisfies a predetermined condition;
    adding the candidate node to the blockchain when the identity verification on the candidate node succeeds; and
    setting a persistent connection between the candidate node and the server.

12. The non-transitory, computer-readable medium according to claim 11, the operations further comprising:
    in response to determining that at least one node of the plurality of nodes has a system characteristic value less than the predetermined value, determining a quantity of the at least one node;
    determining a similarity value between attribute information of each of the at least one node and the node condition; and
    determining a node of the at least one node with a highest similarity value as the target node.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a server, an operation request sent by a client device for performing an operation associated with a blockchain;
obtaining, by the server, attribute information of a user of the client device, comprising:
    presenting a plurality of nodes comprised in a set of nodes to the user, and
    identifying a first node selected by the user in the plurality of nodes;
determining, by the server, a node condition selected by the user based on the attribute information;
determining, by the server and based on the node condition and the determined node, a target node from the set of nodes that have persistently connected to the server, comprising:
    determining whether a system characteristic value of the first node is greater than a predetermined value;
    in response to determining that the system characteristic value of the first node is less than or equal to the predetermined value, determining the first node as the target node; and
    in response to determining that the system characteristic value of the first node is greater than the predetermined value, determining a second node as the target node, wherein a system characteristic value of the second node is less than or equal to the predetermined value; and in response to determining that the second node is not within the set of nodes, setting a persistent link between the second node and the server in response to determining that a consensus on adding the second node to the blockchain has been reached; and
assigning, by the server, the operation request to the target node to perform the operation associated with the blockchain.

14. The computer-implemented system according to claim 13, wherein determining the target node from the set of nodes comprises:

obtaining attribute information of each node in the set of nodes;

determining, based on the attribute information, a node of the set of nodes with attribute information most similar to the node condition; and determining the target node based on the determined node.

15. The computer-implemented system according to claim 13, wherein determining whether the system characteristic value of the first node is greater than the predetermined value comprises at least one of:

determine whether a throughput of the first node is greater than a predetermined throughput; or determine whether a response time of the first node is greater than a predetermined response time.

16. The computer-implemented system according to claim 13, wherein determining the second node as the target node comprises:

determining whether at least one node in the plurality of nodes has a system characteristic value that is less than the predetermined value;

in response to determining that none of the plurality of nodes has a system characteristic value less than the predetermined value, obtaining a server configuration parameter of a candidate node;

performing identity verification on the candidate node using a consensus algorithm of the blockchain when the server configuration parameter satisfies a predetermined condition;

adding the candidate node to the blockchain when the identity verification on the candidate node succeeds; and setting a persistent connection between the candidate node and the server.

17. The computer-implemented system according to claim 16, the operations further comprising:

in response to determining that at least one node of the plurality of nodes has a system characteristic value less than the predetermined value, determining a quantity of the at least one node;

determining a similarity value between attribute information of each of the at least one node and the node condition; and determining a node of the at least one node with a highest similarity value as the target node.

* * * * *